United States Patent
Berggren et al.

(10) Patent No.: US 7,847,527 B2
(45) Date of Patent: *Dec. 7, 2010

(54) APPARATUS AND METHOD FOR IMPROVED POWER FLOW CONTROL IN A HIGH VOLTAGE NETWORK

(75) Inventors: Bertil Berggren, Västerås (SE); Mojtaba Noroozian, Västerås (SE)

(73) Assignee: ABB Research Ltd., Zürich (CH)

(*) Notice: Subject to any disclaimer, the term of this patent is extended or adjusted under 35 U.S.C. 154(b) by 421 days.

This patent is subject to a terminal disclaimer.

(21) Appl. No.: 11/793,386

(22) PCT Filed: Dec. 16, 2004

(86) PCT No.: PCT/SE2004/001932

§ 371 (c)(1),
(2), (4) Date: May 12, 2008

(87) PCT Pub. No.: WO2006/065189

PCT Pub. Date: Jun. 22, 2006

(65) Prior Publication Data

US 2008/0258559 A1    Oct. 23, 2008

(51) Int. Cl.
*G05F 3/04* (2006.01)
(52) U.S. Cl. ........................ 323/216; 323/340
(58) Field of Classification Search ............... 323/216, 323/218, 255, 256, 257, 258, 300, 301, 340, 323/341, 343
See application file for complete search history.

(56) References Cited

U.S. PATENT DOCUMENTS

| | | | |
|---|---|---|---|
| 3,821,456 A * | 6/1974 | Havas | 373/150 |
| 5,166,597 A | 11/1992 | Larsen et al. | |
| 5,227,713 A * | 7/1993 | Bowler et al. | 322/58 |
| 5,469,044 A * | 11/1995 | Gyugyi et al. | 323/207 |
| 5,907,239 A | 5/1999 | Pelletier et al. | |
| 6,737,837 B1* | 5/2004 | Halvarsson et al. | 323/205 |
| 2008/0157748 A1* | 7/2008 | Berggren et al. | 323/356 |
| 2008/0258559 A1* | 10/2008 | Berggren et al. | 307/31 |
| 2008/0265848 A1* | 10/2008 | Berggren et al. | 323/211 |
| 2009/0134850 A1* | 5/2009 | Berggren et al. | 323/215 |
| 2009/0218993 A1* | 9/2009 | Berggren et al. | 323/205 |
| 2009/0251932 A1* | 10/2009 | Owen | 363/44 |

OTHER PUBLICATIONS

Bridenbaugh et al, "Voltage control improvement through capacitor and transformer tap optization", Feb. 7, 1992 IEEE transactions on powwer systems, No. 1, pp. 222-227.*

Bjelogrlic et al, "Application of Newtons optimal power flow in voltage/reactive power control", 1989 IEEE, pp. 105-111.*

Gerbex et al, "Optimal location of muti-type FACTS devices in a power system by means of genetic algorithms", Aug. 2001 IEEE transactions on power systems, vol. 16, No. 3, pp. 537-544.*

(Continued)

*Primary Examiner*—Jeffrey L. Sterrett
(74) *Attorney, Agent, or Firm*—Venable LLP; Eric J. Franklin (57) ABSTRACT

An apparatus for controlling power flow in a high voltage network. A phase shifting transformer includes a tap changer.

19 Claims, 10 Drawing Sheets

OTHER PUBLICATIONS

International Search Report, dated Jul. 19, 2005, Issued on Counterpart International Application No. PCT/SE 2005/001932.
Written Opinion of the International Searching Authority, dated Jul. 19, 2005, Issued on International Counterpart Application No. PCT/SE 2005/001932.

Larsen, Einar V., "A Classical Approach to Constructing a Power Flow Controller," 1999 IEEE, Piscataway, NJ, USA. 1999 IEEE Power Engineering Society Summer Meeting. Conference Proceedings (Cat. No. 99CH36364), vol. 2, pp. 1192-1195; doi:10.1109/PESS.1999.787487; ISBN 0-7803-5569-5.

* cited by examiner

APPARATUS AND METHOD FOR IMPROVED POWER FLOW CONTROL IN A HIGH VOLTAGE NETWORK

CROSS-REFERENCE TO RELATED APPLICATIONS

This application is the national phase under 35 U.S.C. §371 of PCT/SE2004/001932 filed 16 Dec. 2004.

TECHNICAL FIELD

The present invention concerns an apparatus and a method for controlling the power flow in an ac transmission system. More precisely the invention concerns a control apparatus comprising a phase shifting transformer (PST). By a phase shifting transformer should in this context be understood to include a single cored as well as a multiple cored transformer, both of which may comprise a symmetric or an asymmetric design. The phase shifting transformer may also comprise additional voltage regulating means.

BACKGROUND OF THE INVENTION

A phase shifting transformer is previously known for controlling the power flow in an ac transmission line. Such PST comprises a tap changer that serially connects or disconnects additional windings of the transformer. By doing so the phasor orientation is controlled. Power is then moved from adjacent phases to a single phase by connections between windings excited by different parts of the magnetic circuit. In a pure phase shifting transformer a voltage in quadrature to the source voltage is injected into the line.

A phase shifting transformer may be used to control the load distribution between parallel lines to increase total power transfer. Advantageous is the phase shifting transformers capability to block parasitic power flow due to phase angle difference in a feeding network. Power may be distributed to customer in a defined way and circulating power flows may be avoided.

The use of a PST is advantageous in that it has relatively low reactive power consumption. There is no risk of a subsynchronous resonance (SSR) and it is powerful also at low current conditions.

The use of a PST however offers a slow control speed. The tap changer has to go through every tap position in a sequential manner. Each tap change is effected in the order of 3-5 seconds. Thus the PST cannot participate in a decisive way in a transient period following a power disturbance. Further frequent tap changing, in particular at high current conditions, increases the need for maintenance.

The tap changer is a mechanical device and thus slow in operation and an object to mechanical wear. It has a maximum regulation voltage range of 150 kV and a maximum number of operating positions of less than 35. The maximum tap voltage is in the order of 4000-5000V/tap and the maximum rated through current is about 3000-4500 A. The maximum power handling capacity is 6000-8000 kVA/tap and there is a short circuit thermal limit. Small voltage steps make many operations.

Another way to control the power flow in an ac transmission line is the use of a static series compensator, especially a Static Synchronous Series Compensator (SSSC). Such SSSC normally contains a Voltage Source Converter (VSC). In a SSSC a voltage in quadrature to the line current is injected into the line.

A SSSC is controllable from full inductive to full capacitive regulation, and vice versa, within a few fundamental frequency cycles and is thus capable of being a powerful control device in the transient period following a power disturbance. In comparison with a tap changer of a PST the SSSC is not maintenance sensitive to frequent control actions. A SSSC is therefore suitable for closed loop control. However, the SSSC has a larger variation in reactive power production/consumption than the PST. In inductive operation the SSSC consumes reactive power and in capacitive operation the SSSC produces reactive power. Furthermore the SSSC is expensive compared to the PST.

SUMMARY OF THE INVENTION

A primary object of the present invention is to provide a power flow control of an ac power transmission that is rapid and that does not involve the drawbacks of the single use of either a PST or a SSSC.

This object is achieved according to the invention by a control apparatus or by a method.

According to the invention a PST containing a tap changer, a SSSC containing a VSC, and a control unit that controls both the PST and the VSC are combined to form a control apparatus for controlling the power flow in a high voltage network. As a response to a change in the load conditions the power flow is controlled by firstly regulating the VSC of the SSSC and secondly regulating the PST by the tap changer. In a first period of time the control is affected solely by the SSSC and in a second period of time the control is affected by a combined regulation of both the SSSC and the PST. By this control the slow control capability of the PST is compensated for by the rapid capability of the SSSC. In one embodiment every change from one tap to another of the tap changer the SSSC is controlled to compensate for the new tap position. In another embodiment a change from one tap to another of the tap changer is effected while maintaining a stationary regulation of the SSSC. Thus a favorable working condition of the apparatus may be achieved within the controlling ranges of the PST and the SSSC. In an embodiment of the invention the SSSC comprises a series voltage source converter.

In a first aspect of the invention the object is achieved by a control apparatus comprising a PST including a tap changer, a SSSC including a controllable VSC, and a control system containing computer means including a processor for controlling the PST and the VSC of the SSSC in coordination. The control system comprises in a further embodiment a communication unit by which the control is supervised, controlled or overridden by an operator or a customer.

In a second aspect of the invention the objects are achieved by a method for controlling the power flow in an ac transmission line, the method comprising a first step in which the new load demand is rapidly regulated by the VSC of the SSSC and a second step in which a combined regulation of both the PST and the VSC of the SSSC is evaluated. In a further step an internal regulation of a favorable working point for both the PST and the SSSC is accomplished by regulating the PST in coordination with the VSC of the SSSC such that the external power flow control is unaffected.

The PST which is regulated in sequential steps by the tap changer is according to the invention combined with a SSSC which is regulated by a VSC, to provide a fast and adaptive control of the power flow by a common control system. The slow control capability of the PST is compensated for by the rapid control of the VSC. The PST is thus dynamically supported by the VSC of the SSSC when regulating. This dynamically supported PST, in the following text denoted DSPST, comprises a standard tap changer controlled PST combined with a SSSC containing a controllable VSC. The dynamic assistance of the PST reduces the number of control actions made by the tap changer, which dramatically increases the life time cycle of the tap changer.

According to the invention the required rating of a power flow controller (PFC) is divided into two parts, one part consisting of the PST and the other part consisting of the SSSC containing a VSC. The possibility to coordinate the control of the SSSC and the PST offers the rating of both units to be smaller than in circuits where each unit works alone. As a comparison a single PST regulating unit would have to have a large rating and a single SSSC unit would also have to have a large rating. The combination will obtain an overall improvement of the performance as compared to both a single PST and a single SSSC.

BRIEF DESCRIPTION OF THE DRAWINGS

Other features and advantages of the present invention will become more apparent to a person skilled in the art from the following detailed description in conjunction with the appended drawings in which.

DESCRIPTION OF PREFERRED EMBODIMENTS

Figure 1:
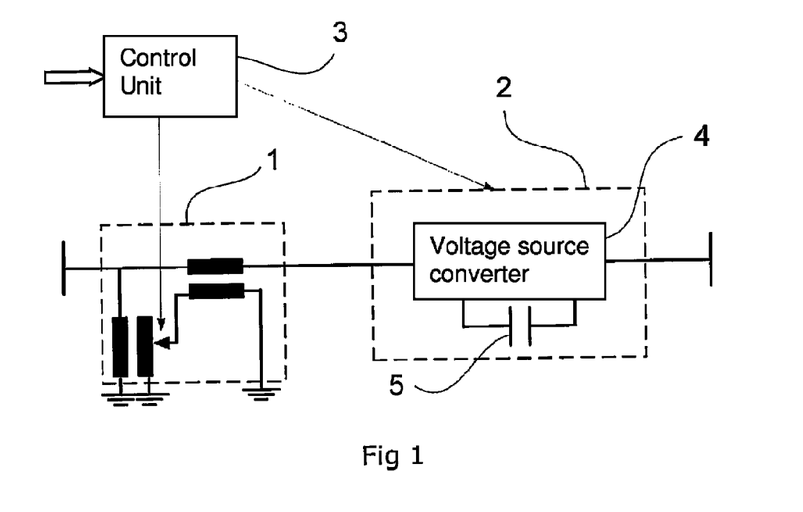
FIG. 1 is a principal circuit of a control apparatus according the invention.
Figure 11:
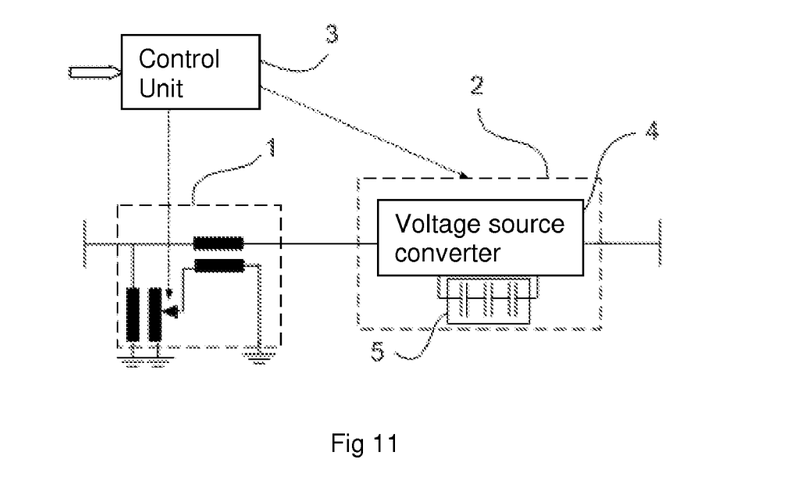
FIG. 11 is an apparatus with a capacitive unit including a plurality of capacitors.
Figure 12:
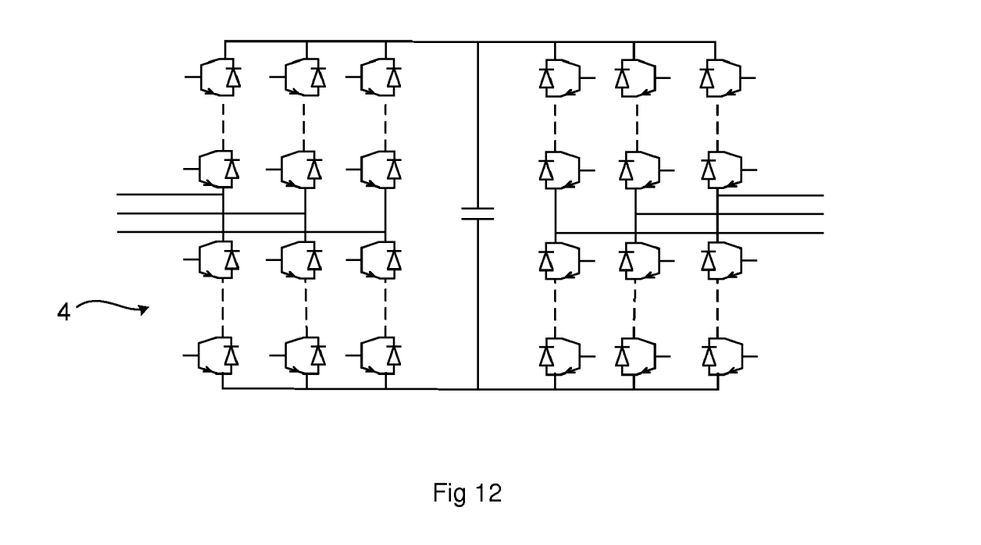
FIG. 12 is a two level bridge including a plurality of series connected switching devices, each switching device comprising a semiconducting unit with a diode connected in antiparallel therewith.
Figure 13:
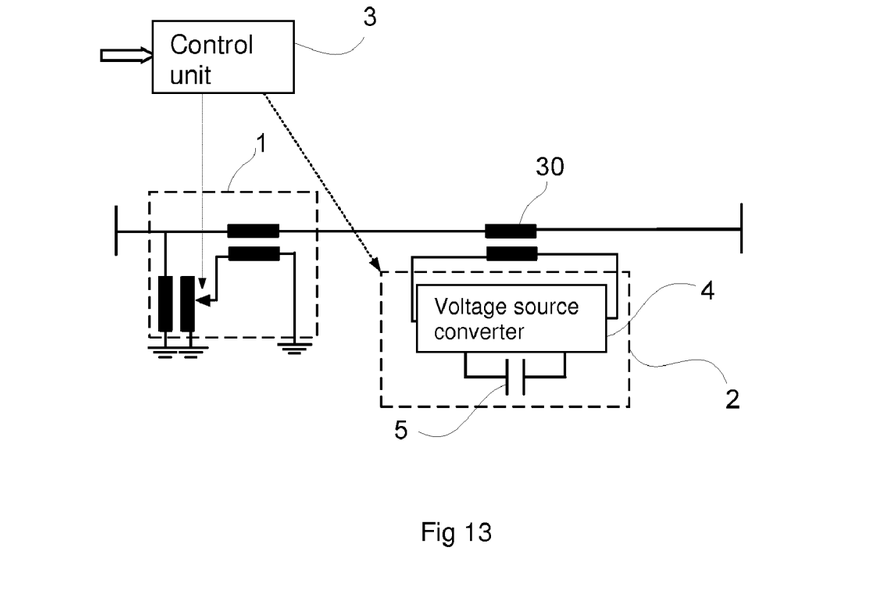
FIG. 13 is an apparatus with a static series compensator connected to an AC line by a series transformer.
Figure 14:
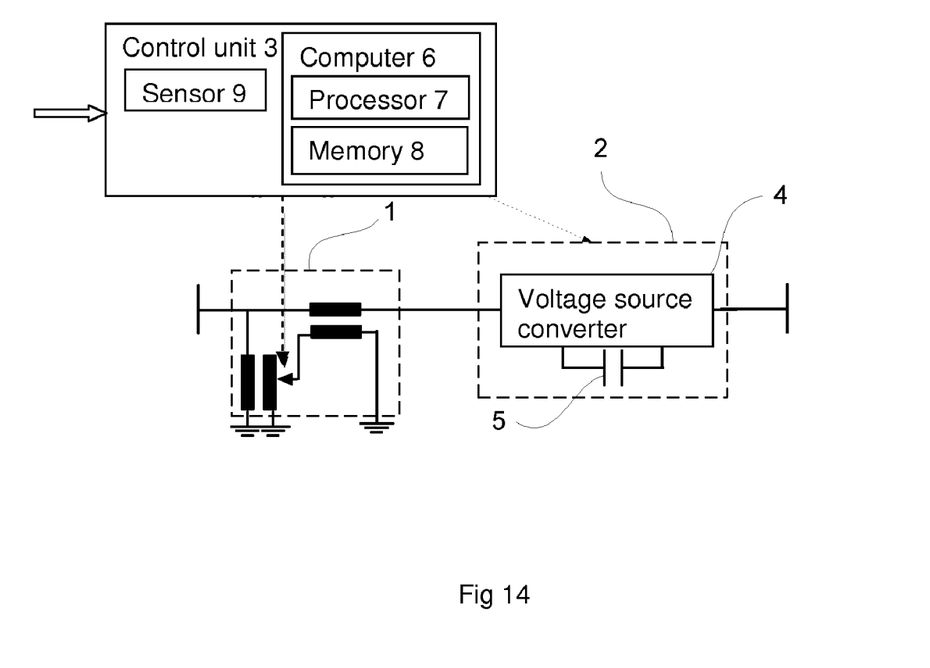
FIG. 14 is an apparatus with a computer including a processor and a memory unit and a sensor for sensing the power flow of the network.

An apparatus for controlling the power flow according to the invention is shown in FIG. 1. The apparatus comprises a tap changer controlled phase shifting transformer (PST) 1, a controlled Static Synchronous Series Compensator (SSSC) 2 and a control unit 3. The SSSC comprises a Voltage Source Converter (VSC) 4 and a DC-capacitor 5. The DC capacitor comprises in one embodiment a plurality of capacitor units, as shown in FIG. 11. The VSC comprises a two level bridge containing a plurality of series connected switching devices, as shown in FIG. 12. Each switching device comprises a semiconducting element with a diode connected in antiparallel therewith. The converter topology is similar to that of a STATCOM and known from the literature. In one embodiment the VSC is connected to the AC line potential directly. In another embodiment the VSC is connected to the line by means of a series transformer 30, as shown in FIG. 13. The control unit may include a computer 6 including a processor 7 and a memory unit 8 and a sensor 9 for sensing the power flow of the network, as shown in FIG. 14.

The SSSC injects a continuously variable series compensating voltage in quadrature with the line current, i.e. either leading or lagging the current with 90 electric degrees. The magnitude of the voltage may be controlled independent of the size of the line current.

The control of the power flow by the PST is accomplished through control of the tap-changer. Since this is a mechanic device and the control has to be done in sequential steps this control is slow.

The control resolution of the apparatus according to the invention (the combined effect of tap changer and SSSC control action) is made infinite over the combined control range as a consequence of the continuously controllable SSSC.

Figure 2:
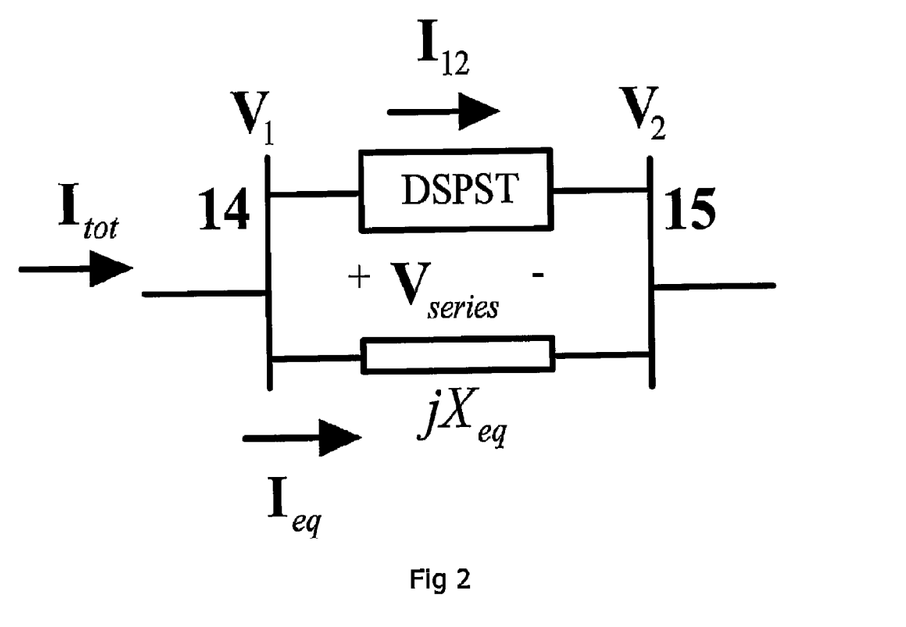
FIG. 2 is a simple network comprising the apparatus.

In order to illustrate the operating range of a DSPST a simple network as shown in FIG. 2 is used. The network comprises a DSPST according to the invention in a parallel connection with an equivalent reactance between a first node 14 and a second node 15. The purpose of a DSPST is to control the distribution of power between on one hand the path in which it is installed and on the other hand parallel paths. The parallel paths are in FIG. 2 represented by the equivalent inductive reactance $X_{eq}$ connected in parallel to the DSPST. By controlling the series voltage $V_{Series}$ the distribution of power flow can be controlled.

The bold faced quantities in FIG. 2 represent phasors (with both a magnitude and a phase). Currents are represented with I and voltages with V.

Figure 3:
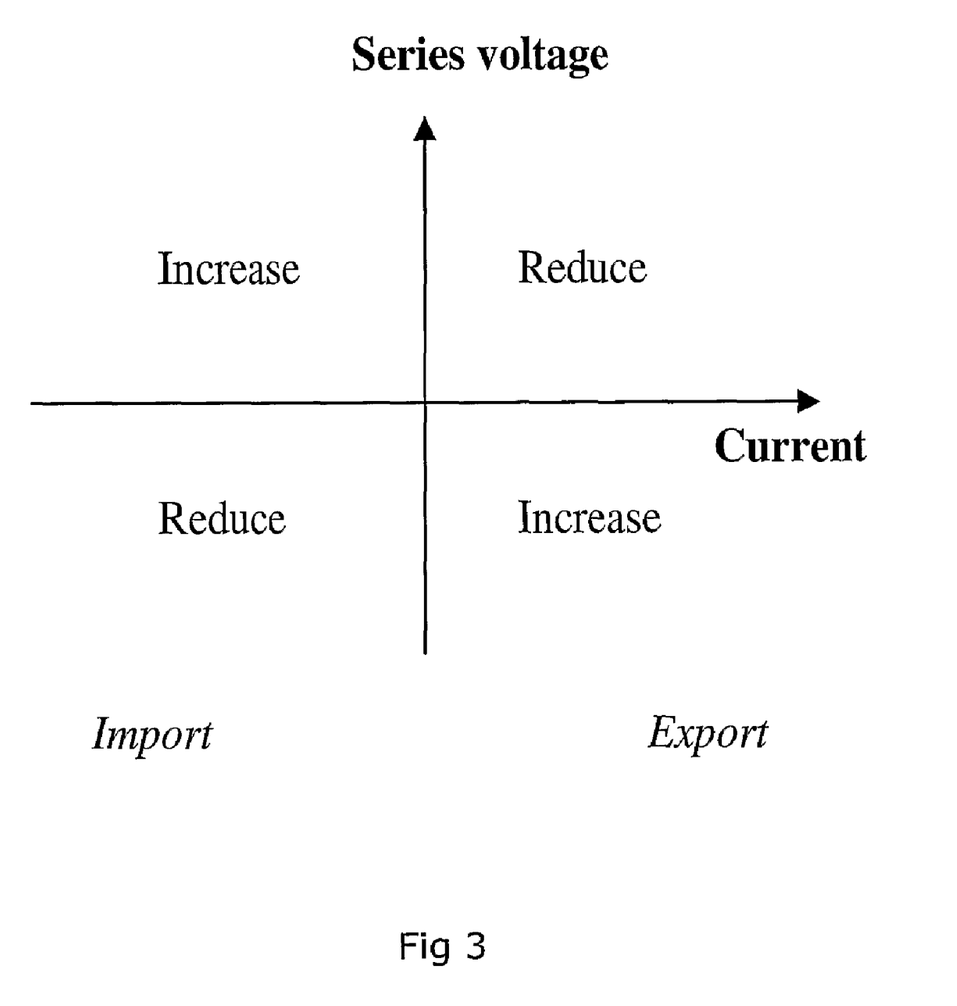
FIG. 3 is the operating range in terms of series voltage and throughput current.

With this simple network, the operating range may be described in a diagram as indicated in FIG. 3, where the current through the DSPST is on the x-axis and the series voltage is on the y-axis.

The left half plane corresponds to current (power) flowing from the second node 15 to the first node 14 (called import) and the right half plane corresponds to current (power) flowing from the first node to the second node (called export). The first and third quadrant correspond to a reduction of the magnitude of the current (power) whereas the second and fourth correspond to an increase of the magnitude of the current (power).

A DSPST comprising a PST and a SSSC may be operated in a purely Static Synchronous Series Compensator (SSSC) mode with the Phase-Shifting Transformer (PST) at zero tap position. A zero tap position implies that only the short circuit reactance of the PST contributes to the series voltage.

Figure 4:
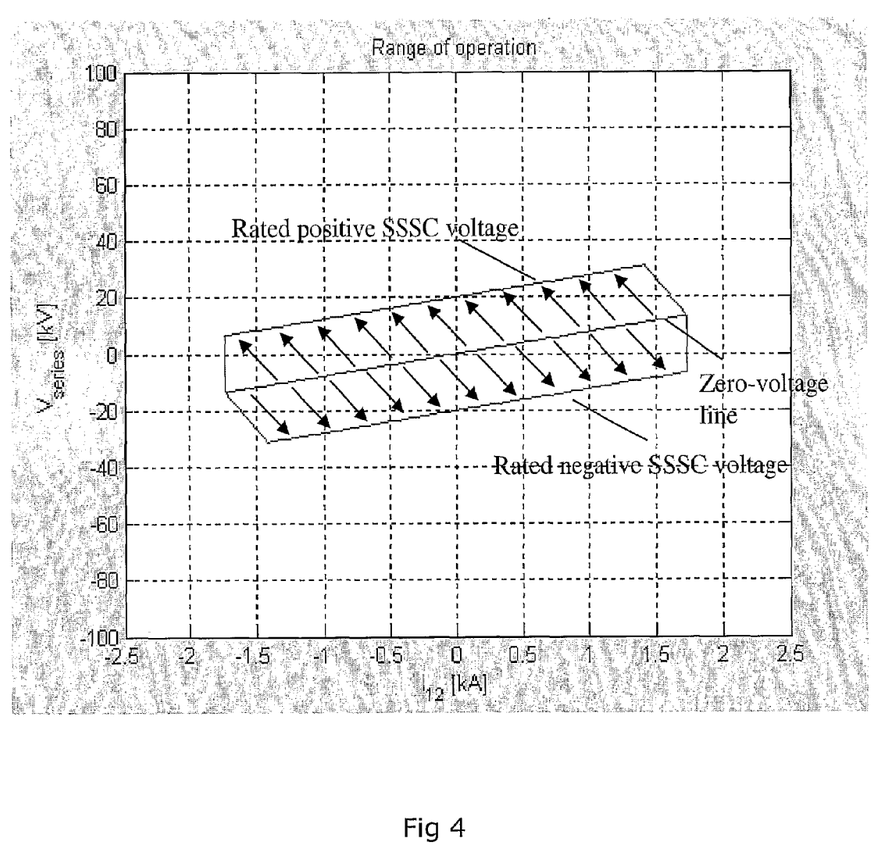
FIG. 4: is the operating range in purely SSSC mode.

FIG. 4 illustrates the operating range in purely SSSC mode. Along the zero-voltage line of the SSSC, the SSSC is neutral to the network. Thus, along this line the SSSC does not inject a series voltage. The slope of the line depends on the short circuit reactance of the PST.

Starting from the zero-voltage line, at rated current in the first quadrant, the voltage across the SSSC is increased in the positive, inductive, direction and the current through the DSPST is as a consequent reduced. The operating point will thus move along lines parallel to the arrows in FIG. 4. The slopes of the arrows will depend on the size of $X_{eq}$. The SSSC will typically be dimensioned such that operation is only allowed for voltages less than a specified series voltage across the SSSC. In a similar fashion the SSSC is typically dimensioned to tolerate throughput currents below a specified limit. When the voltage is increased up to the rating limit, no further reduction of the current can be achieved by operating the SSSC. If the current then decreases the voltage across the DSPST will decrease since the voltage across the PST, due to its short circuit reactance, will decrease. Once the zero current line is crossed, the voltage will become capacitive, relative the current, not because the voltage across the SSSC changes, but because the current changes direction. The operating region is limited in the second quadrant by the rated current. The extension of the operating region by operating the SSSC with negative voltages is evident from FIG. 4.

Figure 5:
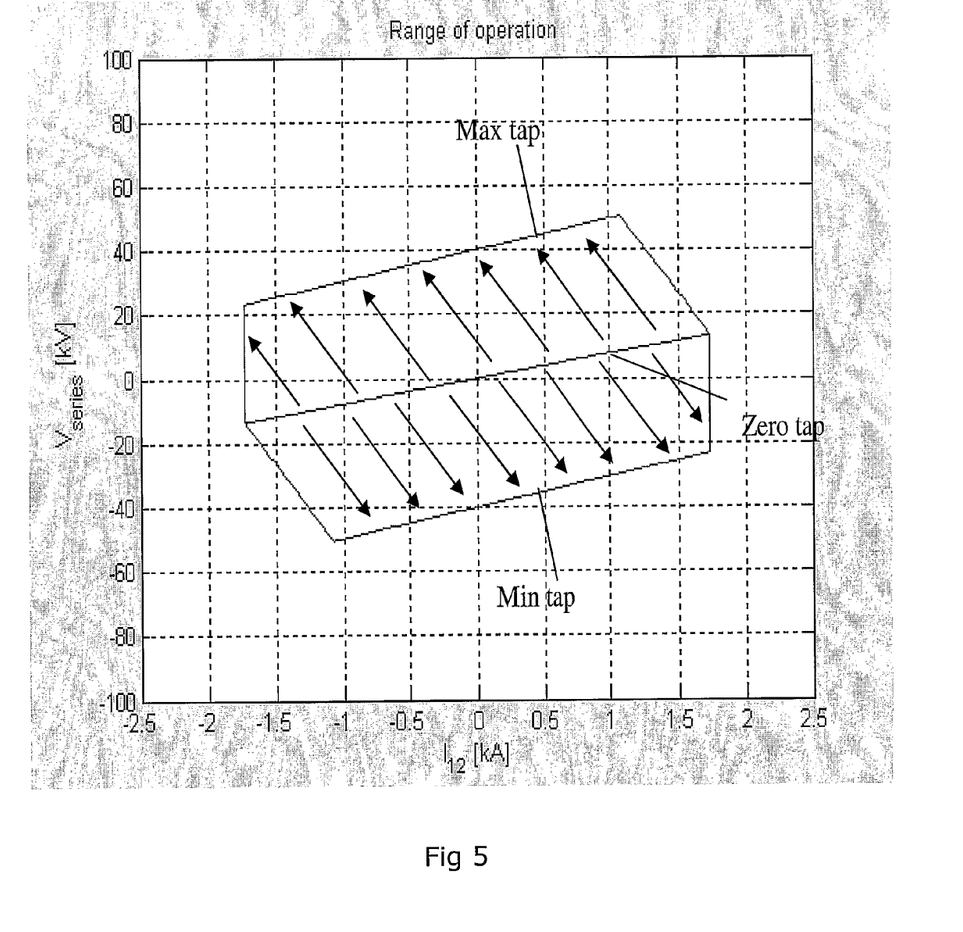
FIG. 5: is the operating range in purely PST mode.

With the SSSC part operated at zero voltage, the DSPST may be operated in a pure PST mode. The operating range then looks as indicated in FIG. 5.

The zero tap line is the same as the zero-voltage line in FIG. 4, i.e. its slope depends on the short circuit reactance of the PST. Starting from the zero tap line, the series voltage increases in the positive direction when the tap-changer is moved towards the most positive position and the magnitude of the series voltage increases in the negative direction when the tap-changer is moved towards the most negative position.

Figure 6:
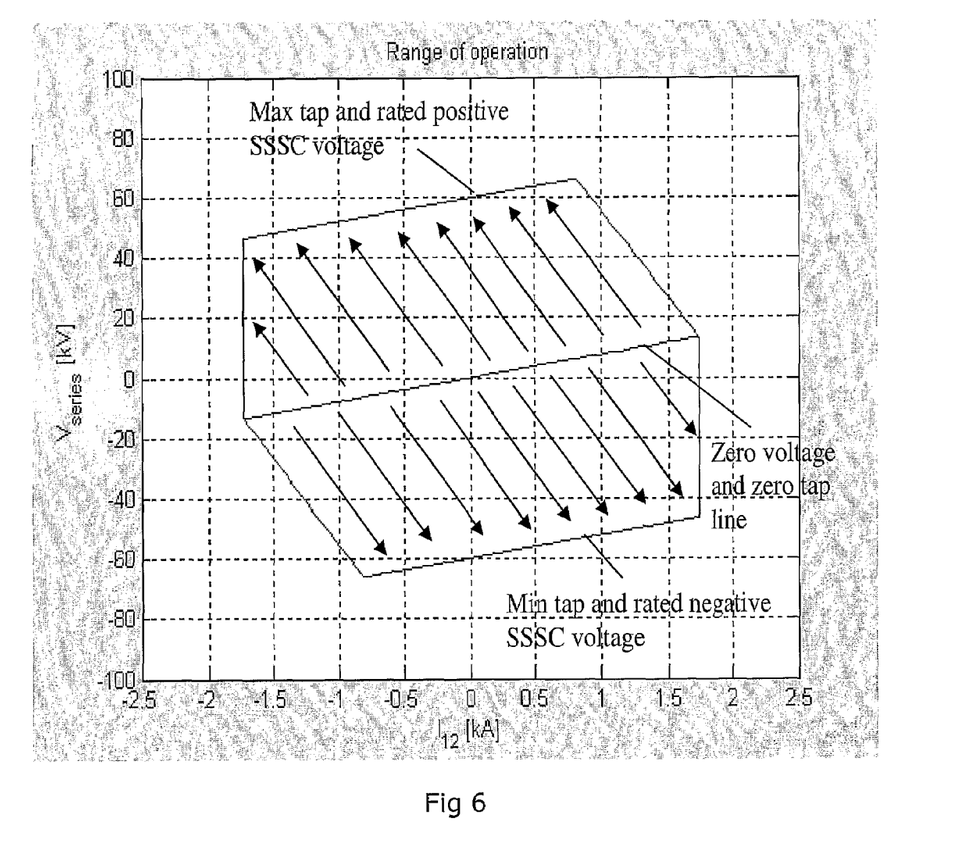
FIG. 6: is the steady state operating range of the apparatus.

FIG. 6 illustrates the DSPST steady state control range when both the PST and the SSSC ranges are combined. Clearly, the operating range is extended in all four quadrants by the combined effect of the PST and SSSC as compared to only a PST or an SSSC.

With dynamic operating range it is meant the part of the operating range that can be controlled fast enough to mitigate the consequences of electro-mechanical transients in a power system. As the SSSC easily may change operating point from rated positive voltage to rated negative voltage, and vice versa, within a fraction of a second, it is well suited for contributing to e.g. damping of power oscillations originating from electro-mechanical oscillations in a synchronous machine like a generator. The PST on the other hand, where each step takes in the order of five seconds and each step must be sequentially passed, is too slow to actively contribute in the transient period. In other words, the dynamic part of the operating range of the DSPST corresponds to the SSSC part.

Figure 7:
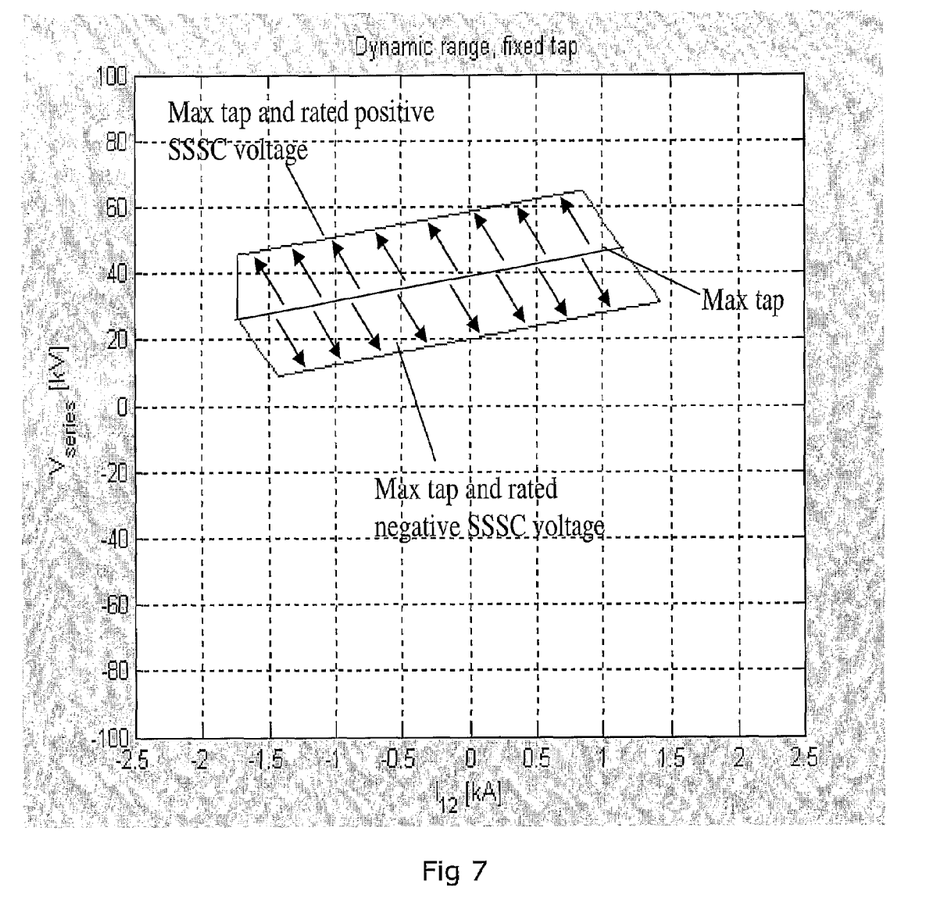
FIG. 7: is the dynamic range of the apparatus with PST in maximum tap position.
Figure 8:
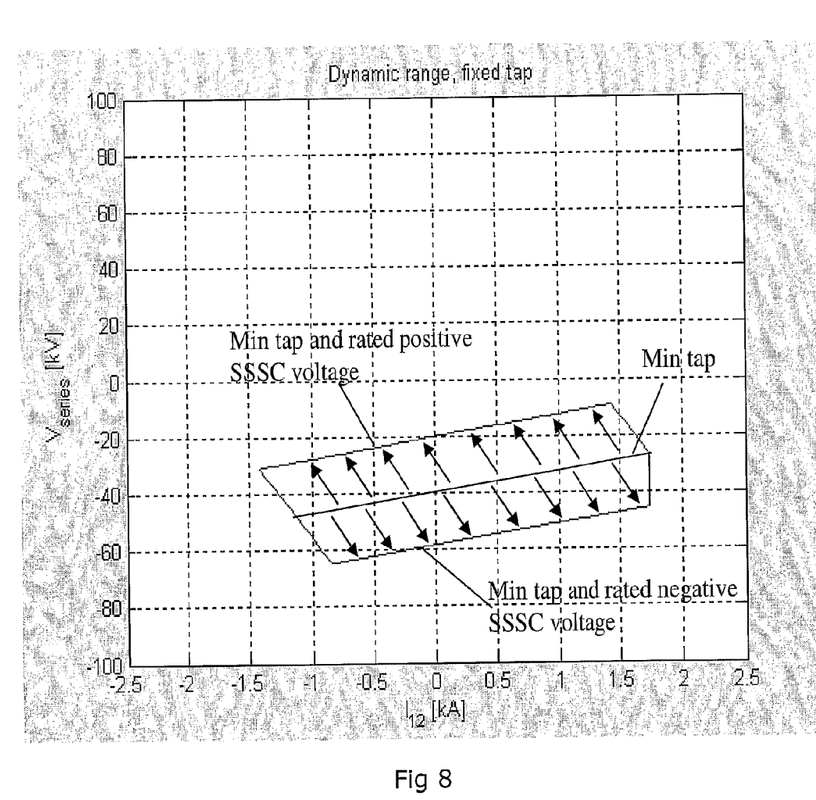
FIG. 8: is the dynamic range with PST in minimum tap position.

However, by controlling the tap-changer in the pre-disturbance situation the over-all characteristics of the DSPST may be changed. FIG. 4 of course gives the dynamic range with the PST in zero tap position. In FIG. 7 the PST is in the maximum tap position. It may be noted that in the export situation, positive throughput currents, the whole dynamic operating range of the DSPST, both positive and negative SSSC voltages, has the over-all dynamic characteristic of decreasing the power flow. Similarly, in the import situation, negative throughput currents, the whole dynamic operating range of the DSPST, both positive and negative SSSC voltages, has the over-all dynamic characteristic of increasing the power flow. Of course a similar feature may be achieved by setting the PST in e.g. the minimum tap position, as indicated in FIG. 8.

It is consequently possible to change the ability of the DSPST to dynamically increase or decrease the power flow.

The main control objectives, i.e. the reasons for installing a control apparatus, which may be denoted a dynamically supported phase shift transformer, DSPST, include one or several of the following;
Slow/quasi-steady state power flow control
Power oscillation damping
Improving transient performance through fast change of transmission corridor characteristics Slow/quasi-steady state power flow control is the slow control of the distribution of power between on one hand the transmission path in which the DSPST is installed and on the other hand parallel paths. The control speed requirements for meeting this objective are low enough to be satisfied by both the PST and the SSSC parts.

Power oscillation damping is the fast control of the DSPST to mitigate power oscillations typically following a disturbance in the power system. The frequency of these oscillations are typically in the range of 0.1-2.0 Hz and depends to a large extent on the inertia constants of the synchronous machines (typically generators) or groups of machines participating in the oscillation. The control speed requirement to meet this objective can only be satisfied by the SSSC part of the DSPST.

By quickly, within a fraction of the transient period following a disturbance, changing the operating point of the SSSC part of the DSPST, the character of the transmission interconnection on which the DSPST is installed can be changed. In its most inductive (reduction) position the angle difference over the transmission interconnection is at its maximum resulting in a reduced power transfer over the interconnection and an increased power transfer over parallel paths. In its most capacitive (increase) position the total angle over the interconnection is at its minimum resulting in an increased power transfer over the interconnection and a reduced power transfer over parallel paths.

In particular if several DSPST are installed and their controls are coordinated, the disturbed part of the system experiencing e.g. stability problems can quickly be relieved of power transfer whereas an intact part of the system picks up the power transfer. By having the capability to go between end positions within say less then 0.5 s after the disturbance occurs, the transient performance of the overall inter-connected system can thus be significantly improved. The PST part is too slow to act within this time frame however its pre-disturbance operating point will affect the overall character of the DSPST and thus the transmission interconnection.

By coordinating the control of the tap-changer and the thyristors, it is also possible to include one or several of the following advantageous control objectives in the control strategy:
Operation of the tap-changer at lowest possible current
Smallest possible number of tap-changer operations
Reactive power consumption control (limitation)
Dynamic range control By controlling the DSPST at high current conditions such that the SSSC part primarily acts first to reduce the current and then the PST part acts primarily at lower current conditions, the stresses on the tap-changer are relieved and the need for maintenance is reduced.

By letting the SSSC part be as fast as possible, and slowing down the PST part even more than it is by nature, the number of tap-changer operations can be reduced. This is accomplished as changes in loading with short duration are handled by the SSSC part and the PST part only acts on changes of longer duration.

The PST part consumes reactive power due to its short circuit reactance, which only has a small variation due to tap-changer position as compared to the SSSC which has a substantially larger variation due to its nature. The SSSC may as a consequence consume or produce a considerable amount of reactive power depending on whether the voltage injected is inductive or capacitive. The inductive or capacitive appearance is accomplished by the voltage leading or lagging the current by 90 electric degrees. As almost the whole operating range can be reached with different mixes of PST and SSSC control action the overall consumption or production of reactive power can be affected. If e.g. the power system for some reason is weak in terms of voltage support, i.e. the voltages are low it is advantageous to produce reactive power or at least limit the overall consumption of reactive power of the DSPST.

If the desired series voltage can be achieved through the combined action of capacitive SSSC voltage and PST, as much SSSC action and as little PST action is advantageous. If the desired series voltage only can be achieved through the combination of inductive SSSC voltage and PST action, as much PST action and as little SSSC action is advantageous. Similarly, if the voltages are high it is advantageous to consume reactive power or at least limit the overall production of reactive power of the DSPST. Obviously the opposite control strategy is to be preferred, i.e. if the desired series voltage can be achieved through the combined action of inductive SSSC voltage and PST, as much SSSC action and as little PST action is advantageous. If the desired series voltage only can be achieved through the combination of capacitive SSSC voltage and PST action, as much PST action and as little SSSC action is advantageous. In addition it is possible to control the over all reactive power balance if means for reactive power shunt compensation is added to the DSPST.

Figure 9:
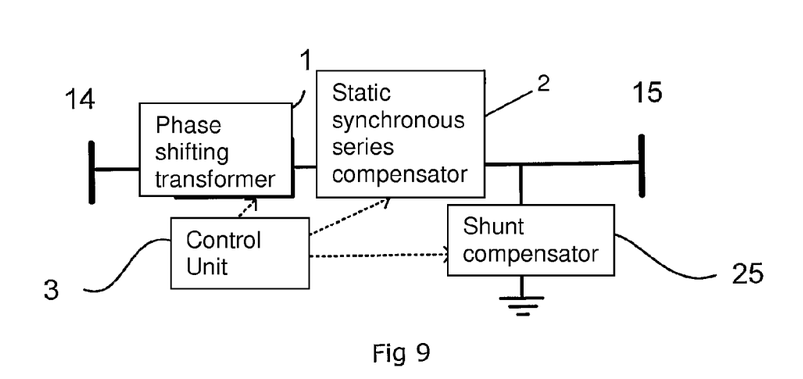
FIG. 9: is an apparatus combined with shunt compensation means.

A control apparatus comprising a PST 1, a SSSC 2, a control unit 3 and further comprising a shunt compensation means 25 is shown in FIG. 9. In this embodiment of the invention means for reactive power shunt compensation is thus included, such that the reactive power balance of the DSPST may be customized to meet the a particular power system requirements. These means include devices such as for instance circuit breaker connected capacitor banks and reactors, static var compensators (SVC) and STATCOM.

Figure 10:
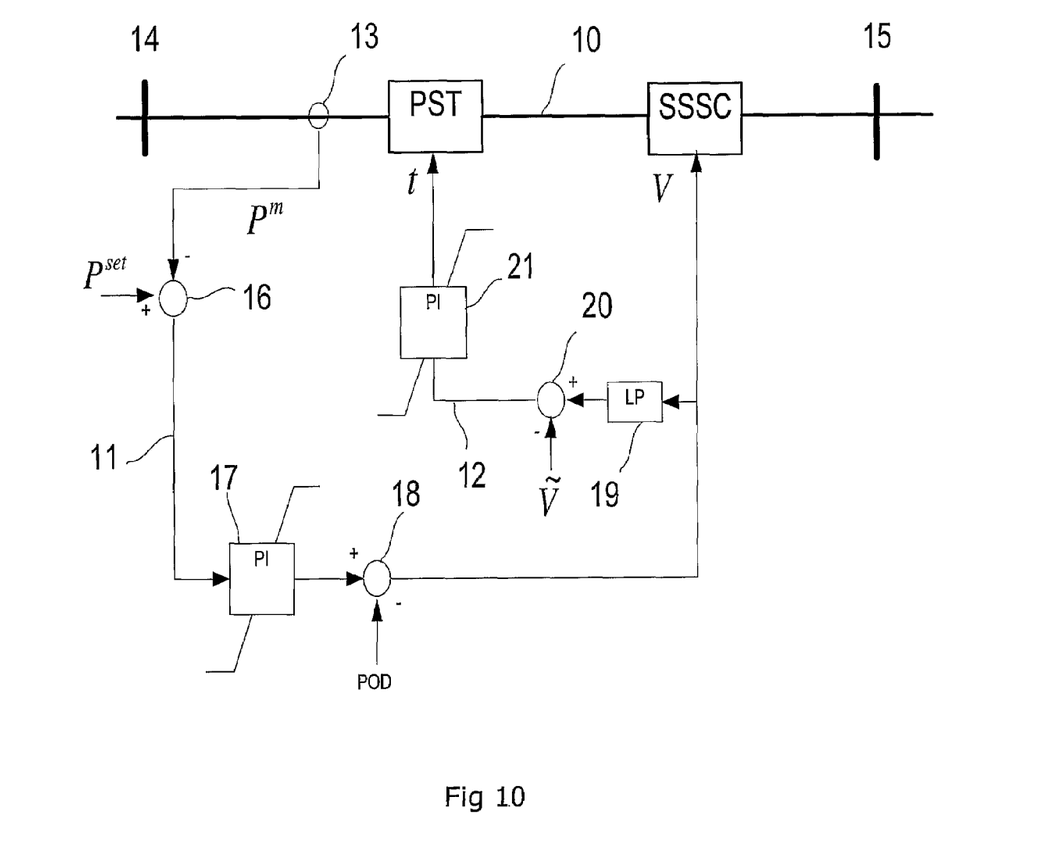
FIG. 10 is a conceptual control scheme of the apparatus.

A control scheme of a DSPST for controlling the power flow according to the invention is shown in FIG. 10. In the embodiment shown the DSPST comprises a PST and a SSSC arranged on a power transmission line 10, a first closed loop 11 and a second closed loop 12. The first closed loop comprises a sensor 13 for sensing the power flow on the line 10 between a first node 14 and a second node 15. Further the first loop comprises a first comparator 16, a PI (Proportional-Integrate) controller 17 and a second comparator 18.

The measured active power flow $P^m$ is compared with a set value, $P^{set}$ corresponding to the desired active power flow. A difference signal is sent to a PI controller with limits. The PI-controller creates a signal proportional to the required voltage which is sent to the control of the SSSC, which by these means is controlled to satisfy the set value of active power flow.

A supplementary signal for Power Oscillation Damping (POD) may be added after the PI controller such that fast electro-mechanical power oscillations can be mitigated by SSSC action.

The second closed loop for controlling the PST comprises a low pass filter 19, a comparator 20 and a PI-controller 21. The signal proportional to the required voltage is sent through the low-pass filter 19 for comparison to a set value of the voltage, $\tilde{V}$. The low-pass filter will block variations of in V of short duration. The difference between the actual value of V and the desired value $\tilde{V}$ is sent to a PI controller with limits which creates a signal proportional to the desired tap, t, which is sent to the tap-changer control.

It is possible to achieve all control objectives listed above by application of the control scheme in FIG. 10.

Slow/quasi-steady state power flow control is obviously achieved.

Power oscillation damping is achieved by introduction of the supplementary POD signal.

Fast change of transmission corridor characteristics can be achieved by quickly changing the set point $P^{set}$, possibly combined with changing the gain of the first PI-controller.

Operation of the tap-changer at high current conditions is avoided in the following way. If the current suddenly increases, in particular into the overload range, the SSSC will first act to reduce the current, and then at lower currents the PST will act to satisfy the set value $\tilde{V}$.

The number of tap-changer operations is reduced by the introduction of a low-pass filter in the tap-changer control branch. This filter will block changes of short duration and thus reduce the number of tap-changer operations.

Reactive power balance control (limitation) can be realized in at least two ways. By changing the set value $\tilde{V}$ the reactive power balance can be controlled, and by introducing reactive power limits in the first PI-controller limiter it can be limited.

Other control schemes can of course also be used to meet the control objectives.

Although favorable the scope of the invention must not be limited by the embodiments presented but contain also embodiments obvious to a person skilled in the art. For instance the transmission line between the PST and the SSSC must not be short as indicated in the accompanied figures but comprise any length as only the PST and the SSSC is serially connected. The closed loop arrangement in FIG. 10 need not be fully closed. Thus it may under certain conditions be favorable for an operator or a customer to choose a desirable working point by direct adjustment of the tap changer of the PST. According to the invention the apparatus would automatically respond to such a forced control of the PST by adjusting the SSSC correspondingly.

The invention claimed is:

1. An apparatus for controlling power flow in a high voltage network, the apparatus comprising:
   a phase shifting transformer having a tap changer,
   a static series compensator comprising a voltage source converter, and
   a control unit configured to control the phase shifting transformer and the static series compensator in coordination.

2. The apparatus according to claim 1, wherein the static series compensator further comprises a capacitor unit.

3. The apparatus according to claim 2, wherein the capacitive unit comprises a plurality of capacitors.

4. The apparatus according to claim 1, wherein the voltage source converter comprises a two level bridge comprising a plurality of series connected switching devices, each switching device comprising a semiconducting unit with a diode connected in antiparallel therewith.

5. The apparatus according to claim 1, wherein the static series compensator is isolated from earth and connected to an AC line on potential.

6. The apparatus according to claim 1, wherein the static series compensator is connected to an AC line by a series transformer.

7. The apparatus according to claim 1, wherein the control unit comprises a computer including a processor and a memory unit and a sensor for sensing the power flow of the network.

8. The apparatus according to claim 1, wherein the control unit comprises a first loop for controlling the static series compensator.

9. The apparatus according to claim 1, wherein the control unit comprises a second loop for controlling the phase shifting transformer.

10. The apparatus according to claim 1, wherein the control unit comprises a unit configured to introduce control parameter values.

11. The apparatus according to claim 1, wherein the phase shifting transformer is positioned at a first location and the static series compensator is positioned at a second location and wherein the first and the second location are separated by a distance.

12. The apparatus according to claim 1, further comprising:
a shunt compensator.

13. The apparatus according to claim 12, wherein the control unit comprises a shunt compensator control configured to control the shunt compensator.

14. A method for controlling power flow in a high voltage network comprising a control apparatus including a phase shifting transformer, the method comprising:
adjusting in a first period of time a voltage of the control apparatus with a controllable static series compensator, and
adjusting in a second period of time a voltage of the phase shifting transformer and the voltage of the control apparatus to achieve a favorable working balance between the phase shifting transformer and the static series compensator.

15. The method according to claim 14, wherein the static series compensator adjustment comprises sensing a power flow, comparing the power flow with a set value, adjusting the power flow with a PI-controller and comparing the power flow with an oscillation damping signal.

16. The method according to claim 15, wherein the phase shifting transformer voltage adjustment comprises filtering a control signal from the static series compensator adjustment, comparison with a series voltage value, and adjustment by a PI-controller.

17. A computer program product, comprising:
a computer readable medium; and
computer program instructions recorded on the computer readable medium and executable by a processor to carry out a method for controlling power flow in a high voltage network comprising a control apparatus including a phase shifting transformer, the method comprising adjusting in a first period of time a voltage of the control apparatus with a controllable static series compensator, and adjusting in a second period of time a voltage of the phase shifting transformer and the voltage of the control apparatus to achieve a favorable working balance between the phase shifting transformer and the static series compensator.

18. The computer program product according to claim 17, wherein the computer program instructions are further for providing the computer program instructions at least in part over a network.

19. The computer program product according to claim 18, wherein the network is the internet.

* * * * *